United States Patent

Fukui

[11] Patent Number: 6,157,242
[45] Date of Patent: Dec. 5, 2000

[54] CHARGE PUMP FOR OPERATION AT A WIDE RANGE OF POWER SUPPLY VOLTAGES

[75] Inventor: Haruyasu Fukui, Nara-ken, Japan

[73] Assignee: Sharp Kabushiki Kaisha, Osaka, Japan

[21] Appl. No.: 09/272,248

[22] Filed: Mar. 19, 1999

[30] Foreign Application Priority Data

Mar. 19, 1998 [JP] Japan ................................ 10-070272

[51] Int. Cl.[7] .................................. G05F 1/10; G05F 3/02
[52] U.S. Cl. ............................................ 327/536; 327/537
[58] Field of Search ..................................... 327/534, 535, 327/536, 537; 307/110

[56] References Cited

U.S. PATENT DOCUMENTS

| | | | |
|---|---|---|---|
| 4,970,409 | 11/1990 | Wada et al. | 327/541 |
| 5,381,051 | 1/1995 | Morton | 327/390 |
| 5,675,279 | 10/1997 | Fujimoto et al. | 327/536 |
| 5,760,638 | 6/1998 | Brigati et al. | 327/536 |

FOREIGN PATENT DOCUMENTS

| | | |
|---|---|---|
| 6-261538 | 9/1994 | Japan . |
| 9-7384 | 1/1997 | Japan . |

*Primary Examiner*—Terry D. Cunningham
*Assistant Examiner*—Anh-Quan Tra

[57] ABSTRACT

In a charge pump for providing a desired boosted output voltage, a plurality of boosting stages are connected in series. The pump also has a clock signal supply circuit for providing clock signals and a boost circuit for boosting the clock signals. Clock signals derived from the clock signal supply circuit are supplied to each of the boosting stages on a former side. In contrast, a boosted clock signal derived from the clock signal boost circuit and a clock signal derived from the clock signal supply circuit are supplied to each of the boosting stages on a latter side.

20 Claims, 9 Drawing Sheets

Fig.9A CLK1
Fig.9B CLK2
Fig.9C CLK3
Fig.9D CLK4

CHARGE PUMP FOR OPERATION AT A WIDE RANGE OF POWER SUPPLY VOLTAGES

BACKGROUND OF THE INVENTION

The present invention relates to charge pumps for outputting boosted voltages and, more particularly, to a charge pump operable at even low power supply voltages.

Charge pumps for boosting a power supply voltage to output a high voltage are used in, for example, nonvolatile semiconductor storage devices such as flash memories. First, the structure of a flash memory will be described.

The structure of a memory cell of the flash memory is schematically shown in FIG. 2. This memory cell 1 has a control gate 2, a floating gate 3, a source 4, and a drain 5. The memory cell 1 stores data of "1" or "0" by electrons injected into the floating gate 3. In the flash memory, there are provided a plurality of memory cell blocks each having such flash memory cells arrayed into an m×n matrix. In each memory cell block, n control gates 2 are connected to each of m word lines, m drains 5 are connected to each of n bit lines, and the sources 4 are connected all in common. Because the sources 4 are connected in common in each block, memory cells are erased collectively block by block and cannot be erased bit by bit, as explained later.

Next, read, write, and erase operations of the flash memory will be briefly described.

Referring to the read operation, when a read signal comprising a control signal, an address signal and the like is fed from outside, a high voltage (e.g., 5 V) is applied to the control gate 2, a low voltage (e.g., 1 V) to the drain 5, and a low voltage (e.g., 0 V) to the source 4. Then, by comparing a current flowing between the source 4 and the drain 5 of a memory cell to be read with a current flowing through a reference memory cell by a sense amplifier, data discrimination between a "1" and a "0" is performed. After that, read data from the memory cell is output to the outside, where the read operation is completed.

The write operation is carried out as follows.

A control signal, data and an address signal are fed from outside of the flash memory, and a high voltage (e.g., 12 V) is applied to the control gate 2, a high voltage (e.g., 7 V) to the drain 5, and a low voltage (e.g., 0 V) to the source 4. When this occurs, hot electrons generated in proximity to a drain junction are injected to the floating gate 3 due to the high voltage applied to the control gate 2. After this, with the write state turned off, a verify operation is performed. If the written cells are successful in verification, the write operation is completed. If a cell fails in verification, the write operation is performed again and then a verify operation is performed. This process is repeated a prescribed number of times. Then, if the verification has resulted in a failure, "Write Error Status" is output back to outside.

Lastly, the erase operation will be described.

The erase operation is carried out block by block. A control signal, an address signal, and erase data are fed from outside. Also, a low voltage (e.g., −10 V) is applied to the control gate 2, the drain 5 is put into a floating state, and a high voltage (e.g., 6 V) is applied to the source 4. When such voltages are applied, a high electric field is generated between the floating gate 3 and the source 4, making it possible to pull out the electrons from the floating gate 3 to the source 4 by a tunneling phenomenon. After this, with the erase state turned off, a verify operation is performed as in the write operation. If all the memory cells in an erase block are successful in verification, the erase operation is completed. If the erase block fails in verification, the erase operation is done again and then a verify operation is performed. This process is repeated a prescribed number of times. Then, if the verification has resulted in a failure, "Erase Error Status" is output back to outside.

In this connection, the high positive voltages (12 V, 7 V, etc.) and the negative voltages (−10 V, etc.) fed to the control gate 2, the drain 5 and the source 4 of the memory cell 1 in the read, write and erase operations and the like as described above are, generally, generated and applied by a charge pump.

An example of prior art high voltage charge pumps is shown in FIG. 3.

In the charge pump, a plurality of boosting stages stg1, . . . , stg8 (only 8 stages are shown in the figure) are connected in series, each stage comprising N-channel MOS transistors N1 and N2, and capacitors C1 and C2. To the capacitors C1 and C2 of the individual stages, clock signals CLK1 and CLK2, or CLK3 and CLK4, which are shown in FIGS. 4A, 4B, 4C and 4D, are applied, respectively.

Operation of this high voltage charge pump is briefly explained.

The clock signals CLK1, CLK2, CLK3 and CLK4 to be input to the boosting stages are square waves each having appropriate periods and cycles of "H" and "L", as depicted in FIGS. 4A–4D. This charge pump accumulates electric charges in the capacitor C2 of, firstly stg1, and then stg2, stg3, . . . , successively, to finally obtain a desired high voltage. In the charge pump, in receiving a boosted voltage in the capacitor C2 of one stage from the preceding-stage capacitor C2, any voltage drop of the boosted voltage delivered from the preceding stage is suppressed by timely changing the clock signal CLK1 or CLK3 input to the capacitor C1 from a ground level to a power supply voltage level. After that, the boosted voltage delivered to the capacitor C2 is further boosted by changing the input clock signal CLK2 or CLK4 from the ground level to the power supply voltage level. As a result, the potential boosted at the preceding stage is boosted further by a voltage approximately equal to the magnitude of the power supply voltage. As this sequence of operations is repeated, the output voltage of each pump stage increases with increasing number of stages of the pump.

However, as the voltage generated by the high voltage charge pump increases, threshold voltages of the transistors N1, N2 increase due to the backgating effect. That is, the higher the voltage generated by each stage of the high voltage charge pump becomes, the higher the threshold voltages of the transistors N1, N2 of the stage become. Accordingly, in the pump final stage where the highest voltage is generated, the threshold voltages of the transistors become the largest by the backgating effect. When the threshold voltages of the transistors become equal to the voltages of the clock signals input to the pump, the high voltage charge pump cannot boost the voltage any more.

As an example, if a power supply voltage is about 5 V, the voltages of the clock signals are enough large relative to the threshold voltages of the transistors. Thus, there occurs no voltage drop of a boosted voltage at the time of charge delivery. In contrast to this, if a power supply voltage is as low as about 3 V, a voltage drop will occur in the final stage at the delivery of boosted charge from the preceding stage, resulting in a low boosting efficiency of the pump. Further, with an even lower power supply voltage of about 2 V, the threshold voltages of the transistors in the final stage become approximately equal to the voltages of the clock signals input to the pump, making it impossible to achieve a voltage higher than the voltage delivered from the preceding stage. This means that even if further pump stages are added, the voltage cannot be boosted any more. That is, the boosted voltage that could be generated with the charge pump at a power supply voltage of 5 V can no longer be generated with a low voltage power supply of about 2 V because of a great effect of an increase in threshold voltage of the transistors. Therefore, in order to design a low-power-supply-voltage and low-power-consumption device, there is a need of decreasing the threshold voltages of the transistors.

As an example of high voltage charge pumps operable with a low-voltage power supply that can cope with the increase in the threshold voltage of transistors due to the backgating effect, a circuit disclosed in Japanese Patent Laid-Open Publication HEI 6-261538 is known.

The high voltage charge pump disclosed in Japanese Patent Laid-Open Publication HEI 6-261538 is additionally equipped with a circuit for boosting the clock signal voltage. With this arrangement, any drop of a boosted potential at the time of the delivery from one stage to another is suppressed even with a low voltage power supply, so that the boosting efficiency is increased.

In the above prior art high voltage charge pump, however, a clock signal boosting circuit can generate no more than a single boosted voltage. That is, the prior art charge pump is only capable of generating a boosted voltage which is the power supply voltage multiplied by a constant. In such a high voltage charge pump, boosting of the clock signal voltage is effective as far as a particular low-voltage power supply voltage is concerned. When a wider range of power supply voltages is involved, however, boosted clock signal voltages may become too high with higher power supply voltages. In such a case, high voltages would be applied to elements such as transistors, capacitors and the like constituting the circuit, and in worst cases, the elements would be broken down, adversely affecting the device reliability. Besides, normally, as the amount of current necessary for the boosted voltage increases, the capacity of the boosting capacitors increases. Whereas the boosting capacitors need to be charged by the circuit that boosts the clock signal voltage, the capacity for boosting the clock signal voltage needs to be larger than the capacity of the boosting capacitor of the pump, which leads to an increase in layout area.

Furthermore, Japanese Patent Laid-Open Publication HEI 9-7384 discloses a phase signal generating circuit for use in a charge-pump type negative voltage supply circuit, in which clock signals (phase signals) corresponding to low power supply voltages and high power supply voltages, respectively, are generated. This circuit, unfortunately, has a problem in that the circuit scale is large, which leads to an increase in layout area. Also, because of the arrangement that all pump stages of the negative voltage charge pump are individually connected to the phase signal generating circuit, the layout area is further increased. Moreover, because a boost phase signal varies from a negative potential to power supply potential (Vcc), a back flow of a current tends to occur in the phase signal generating circuit, causing circuit troubles.

SUMMARY OF THE INVENTION

Therefore, an object of the present invention is to provide a charge pump operable with a wide range of power supply voltages, while reducing the layout area as much as possible, wherein the pump is able to prevent breakdown of transistors, capacitors, and the like due to overboosting of clock signals on one hand, and, on the other hand, is able to relax the influence of the backgating effect and boost the power supply voltage to higher voltages than in the prior art even if the power supply voltage is low.

In order to accomplish the above object, a charge pump according to an aspect of the present invention comprises:

n (n: an integer, n≧2) series-connected boosting stages for receiving an input voltage and providing a boosted output voltage, each boosting stage having first and second switching transistors and first and second boosting capacitors associated with the first and second switching transistors, respectively, each boosting capacitor connected with a gate of the associated switching transistor;

a clock signal supply circuit for providing a first clock signal and a second clock signal which have specified phases different from each other; and a clock signal boost circuit for boosting voltages of the first and second clock signals, wherein in m (m: an integer, n>m≧1) latter boosting stages, inclusive of a final boosting stage, of all the n boosting stages, the first and second boosting capacitors are supplied with the boosted first and second clock signals output from the clock signal boost circuit, respectively, while in (n−m) former boosting stages, the first and second boosting capacitors are supplied with the first and second clock signals output from the clock signal supply circuit, respectively.

The present invention has been made, paying attention to the following fact. In the prior art high voltage charge pump shown in FIG. 3, it is the final boosting stage of the pump that the threshold voltage of the transistors becomes the largest due to the backgating effect, and the increase in the threshold voltages of the transistors matters at one or more latter boosting stages including this final stage. In each of former boosting stages, because of a relatively low boosted voltage inputted from the preceding stage, the threshold voltages of the transistors scarcely increase so that the stages can normally be driven by clock signals having a magnitude substantially equal to a magnitude of a power supply voltage.

In the charge pump according to the present invention, therefore, normal first and second clock signals (namely, CLK1 and CLK2, or CLK3 and CLK4 in a shown embodiment) are supplied to only former boosting stages of all boosting stages of the charge pump, while the boosted clock signals (namely BSTCLK1 and BSTCLK2 in shown embodiments) are supplied to one or more latter boosting stages including the final stage of the pump. Desirably, the clock signals may be boosted appropriately in accordance with a magnitude of a power supply voltage used in the circuit.

As a result of this, appropriately boosted clock signals are effectively applied only to the boosting stages on the latter side where an increase in the threshold voltage of the transistors due to the backgating effect affects the circuit operation. On the other hand, excessively boosted clock signals are never applied to the boosting stages on the former side. Thus, application of any excessive voltages to devices such as transistors and capacitors is prevented, and reduction in reliability, breakdown of devices and the like can be obviated.

Furthermore, a charge pump according to another aspect of the present invention comprises:

n (an integer, n≧2) series-connected boosting stages for receiving an input voltage and providing a boosted output voltage of a magnitude, each boosting stage having first and second switching transistors and first and second boosting capacitors associated with the first and second switching transistors, respectively, each boosting capacitor connected with a gate of the associated switching transistor;

a clock signal supply circuit for providing a first clock signal and a second clock signal which have specified phases different from each other; and a clock signal boost circuit for boosting a voltage of one of the first and second clock signals, wherein in m (m: an integer, n>m≧1) latter boosting stages, inclusive of a final boosting stage, of all the n boosting stages, if the first clock signal is boosted, the first and second boosting capacitors are supplied with the boosted first clock signal output from the clock signal boost circuit and the second clock signal output from the clock signal supply circuit, respectively, and if the second clock signal is boosted, the first and second boosting capacitors are supplied with the first clock signal output from the clock signal supply circuit and the boosted second clock signal output from the clock signal boost circuit, respectively, while in (n−m) former boosting stages, in both cases, the first and second boosting capacitors are supplied with the first and second clock signals output from the clock signal supply circuit, respectively.

Even with the arrangement that only one of the first and second clock signals (namely, CLK1 or CLK2, or CLK3 or CLK4 in a shown embodiment) is boosted, it is possible to eliminate a boosting loss caused by a boosted voltage drop inside the pump boosting stages due to an increase in the transistor threshold voltage by the back gate effect. Thus, desired boost operations of the pump are available.

With this arrangement, the clock signal boost circuit can be reduced in circuit scale, and the layout area can be thus reduced.

In the meanwhile, with a wide range of power supply voltages, boosting of clock signals is required for low power supply voltages, while for higher power supply voltages, no boosting of clock signals or boosting by a voltage of a decreased magnitude is required to operate the boosting stages sufficiently normally.

In an embodiment, paying attention to this point, the clock signal boost circuit comprises a circuit for switching an operational mode of the clock signal boost circuit between a boosting mode and a non-boosting mode, in accordance with a control signal. Also, alternatively or additionally, the boost circuit comprises a circuit for changing a magnitude of a voltage by which the clock signals are boosted, in accordance with a control signal.

Such an arrangement makes it possible to apply a clock signal of an optimum magnitude responsive to a power supply voltage used. As a result, application of excessively boosted clock signals to the boosting stages is avoided.

According to a further aspect of the present invention, there is provided a charge pump which comprises:

a plurality of series-connected boosting stages for receiving an input voltage and providing a boosted output voltage;

a clock signal supply circuit for providing a first clock signal and a second clock signal that have same waveforms, but different phases from each other, wherein the first clock signal is intended for odd-numbered boosting stages and the second clock signal is intended for even-numbered boosting stages; and a clock signal boost circuit for boosting voltages of the first and second clock signals, wherein each of one or more latter boosting stages, inclusive of a final boosting stage, of all the boosting stages, is supplied with the boosted first or second clock signal, while each of the other, former boosting stages is supplied with the first or second clock signal not boosted.

In an embodiment, the clock signal supply circuit further provides third and fourth clock signals that have same waveforms, but different phases from each other, the third and fourth clock signals being intended for the odd-numbered boosting stages and the even-numbered boosting stages, respectively. The clock signal boost circuit further boosts the third and fourth clock signals. Then, each of said one or more latter boosting stages is further supplied with the boosted third or fourth clock signal, while each of the former boosting stages is further supplied with the third or fourth clock signal not boosted.

In another embodiment, each of all the boosting stages is supplied with the third or fourth clock signal not boosted, in addition to the first or second clock signal not boosted.

To sum up, as is obvious from the above, the present invention can offer a charge pump which is able to operate with a wide range of power supply voltages, but yet does not require a large layout area, which prevents breakdowns of circuit elements, such as the transistors and the capacitors, from occurring because of overboosting of the clock signals, and which can relax the influence of the back gate effect and is thus enabled to boost an input voltage to higher voltages even with low power supply voltages.

It is to be noted that the present invention is applicable not only to positive voltage charge pumps for providing desired voltages boosted in the positive voltage direction, but also to negative voltage charge pumps for providing desired voltages boosted in the negative voltage direction.

Further objects, features and advantages of the present invention will be obvious from the following detailed description.

BRIEF DESCRIPTION OF THE DRAWINGS

The present invention will become more fully understood from the detailed description given hereinbelow and the accompanying drawings which are given byway of illustration only, and thus are not limitative of the present invention, and wherein.

DETAILED DESCRIPTION OF THE PREFERRED EMBODIMENTS

Hereinbelow, embodiments of the present invention are described in detail with reference to the accompanying drawings, wherein like parts are designated by like reference symbols.

(Embodiment 1)

Figure 1:
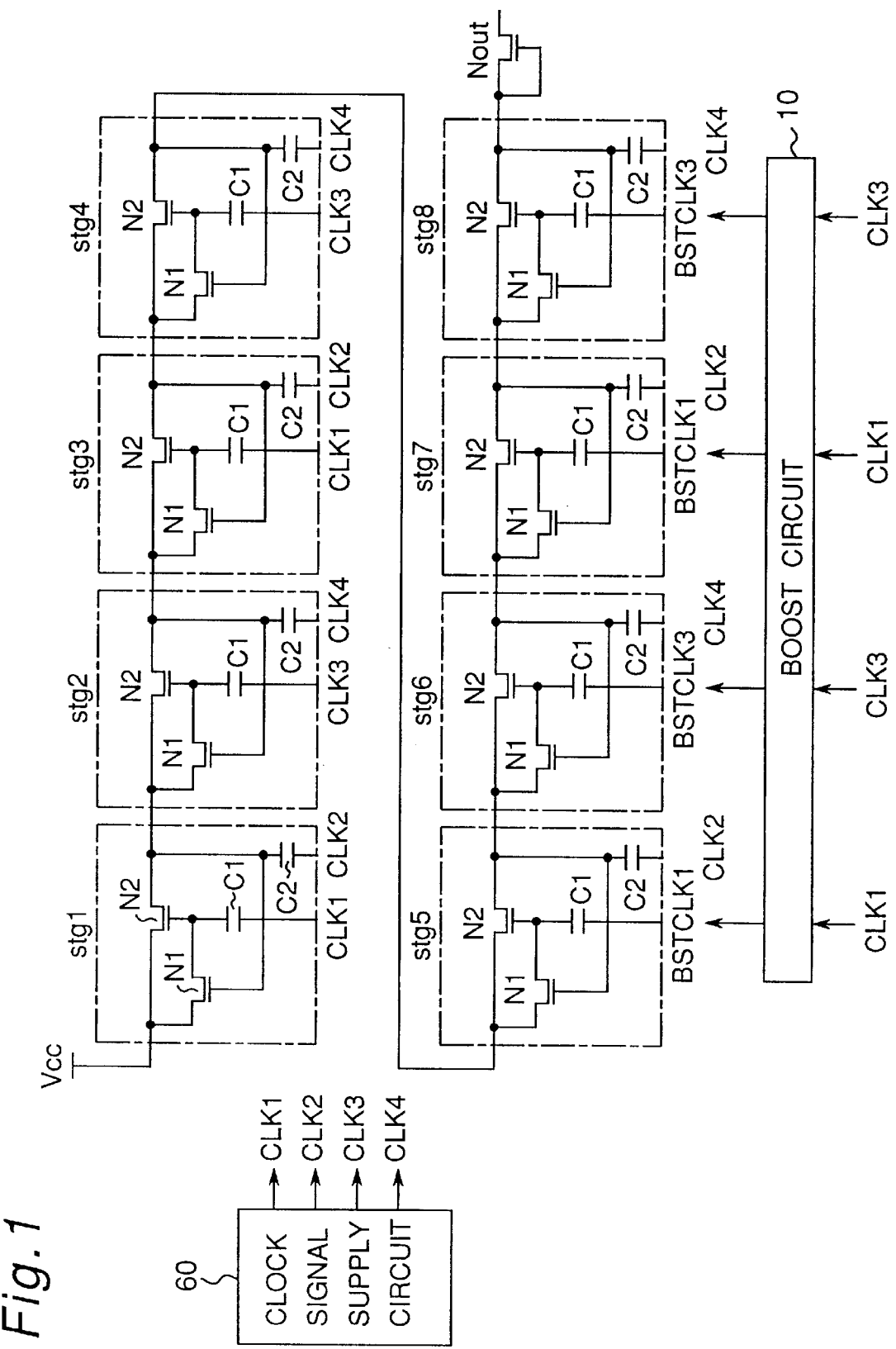
FIG. 1 is a circuit diagram of an embodiment of the high voltage charge pump of the present invention.

FIG. 1 is a circuit diagram showing the construction of a charge pump which is a first embodiment of the present invention. In FIG. 1, parts similar to those in FIG. 3 are indicated by the same reference symbols.

Figure 3:
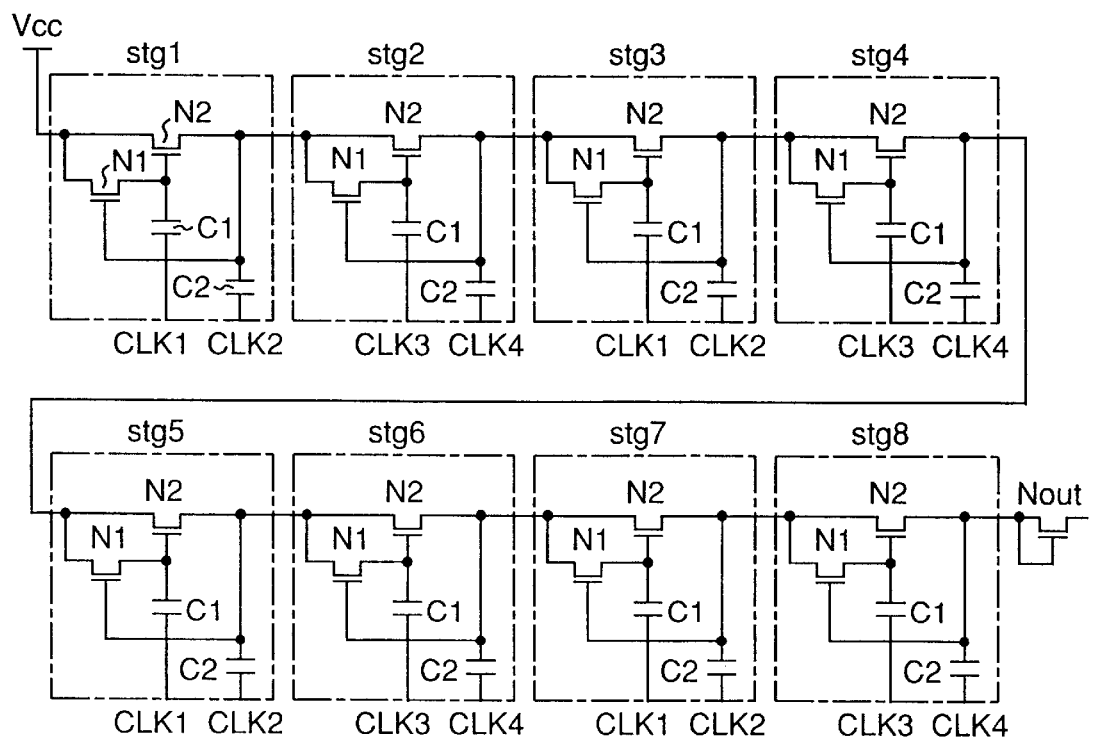
FIG. 3 is a circuit diagram of a high voltage charge pump according to the prior art.
Figure 4:
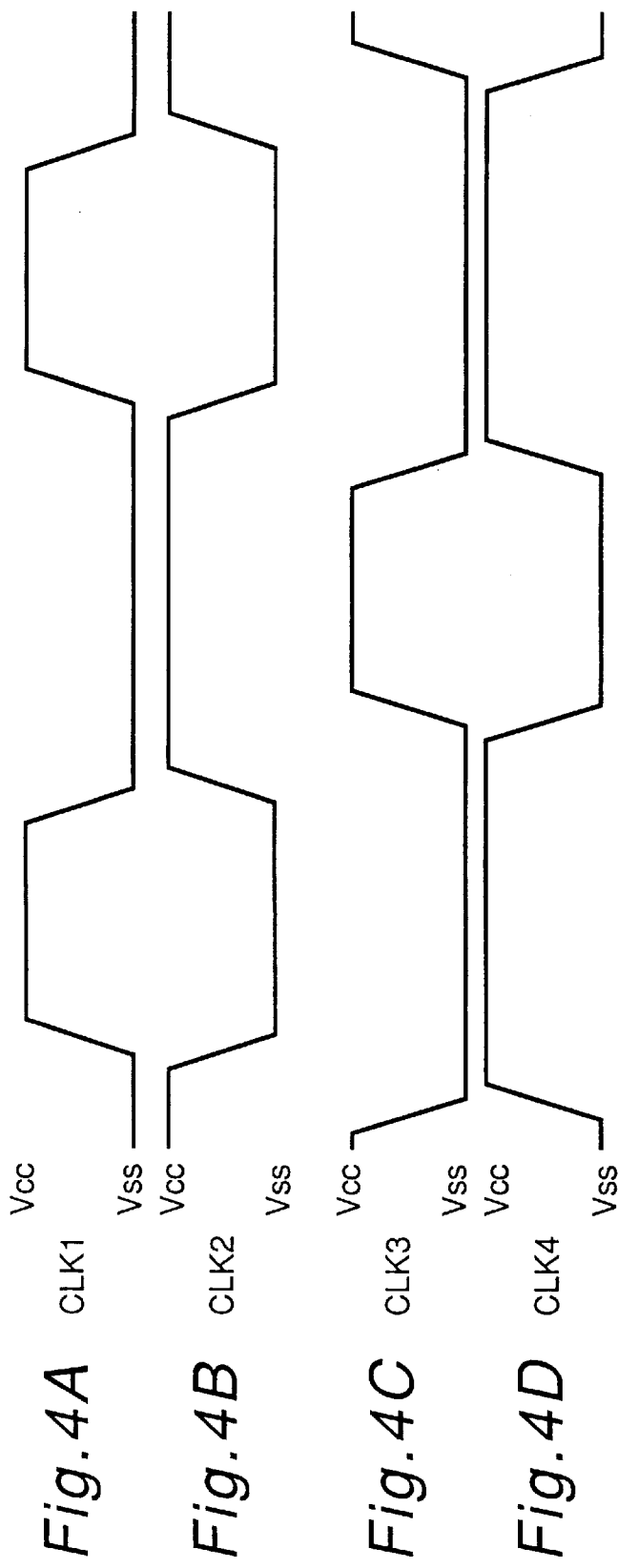
FIGS. 4A, 4B, 4C and 4D are waveform diagrams of clock signals for driving a high voltage (positive voltage) charge pump, respectively.

Like the charge pump of the prior art shown in FIG. 3, a plurality of boosting stages stg1, . . . , stg8 (8 stages in the figure) are connected in series. Each stage has N-channel MOS transistors N1, N2, and capacitors C1, C2. The structure of each of the plurality of boosting stages is similar to that of the prior art, and when a boosted voltage is received by a capacitor C2 from a preceding-stage capacitor C2, a drop of a charge potential delivered from the preceding stage is suppressed by changing a clock signal inputted to the capacitor C1 from a ground level to a power supply voltage level at good timing.

The first embodiment is different from the prior art charge pump in that, instead of the conventional clock signals CLK1 and CLK3, boosted clock signals BSTCLK1 and BSTCLK3 obtained by boosting the clock signals CLK1 and CLK3 by a clock signal boost circuit 10 are used as clock signals to be applied to the capacitors C1 (capacitors for boosting gate voltages of the N-channel MOS transistors N2) of the fifth and the subsequent stages on the latter stage side. It is noted that the clock signal for the capacitor C2 (a capacitor for boosting a voltage to be output to the succeeding stage) of each of the fifth and the following stages is CLK2 or CLK4 as in the prior art. The application of clock signals to the capacitors C1 and C2 of each of the first to fourth stages on the former side is the same as in the prior art.

Figure 5:
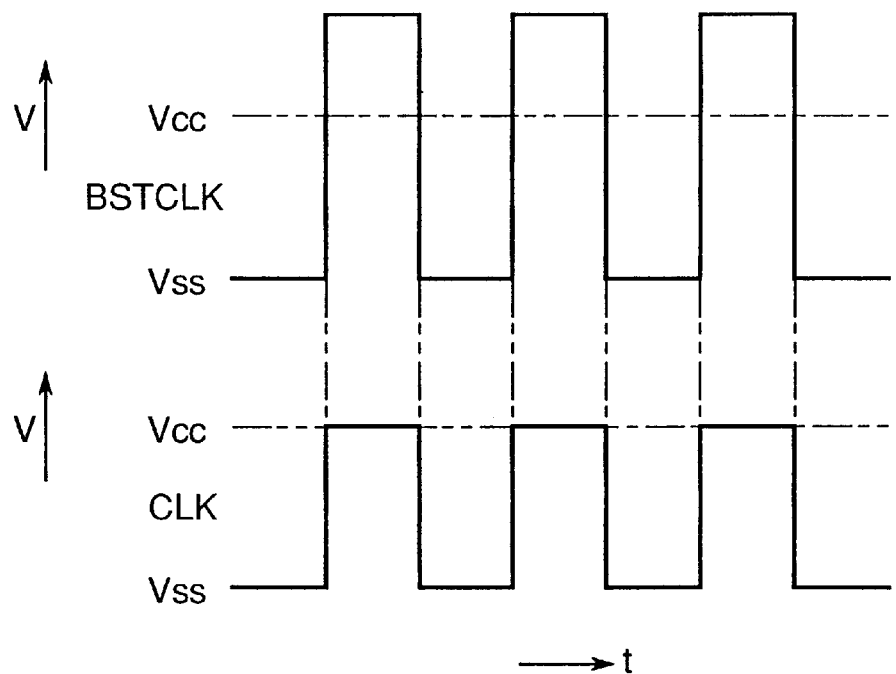
FIG. 5 is an explanatory signal waveform diagram schematically showing the relationship between clock signal CLK and boosted clock signal BSTCLK.

In this embodiment, as to the fifth and the following stages of the charge pump, when a boosted voltage is received from a preceding stage, a boosted clock signal BSTCLK (i.e., a clock signal which has the same phase as an input clock signal CLK and which has an amplitude, or swing larger than the power supply voltage (Vcc), as shown in FIG. 5) is applied from the clock signal boost circuit 10 to one electrode of the capacitor C1. An ordinary booster circuit can be used as the clock signal boost circuit. As a result of application of the boosted clock signal to the latter stages of the high voltage charge pump where the backgating effect would appear noticeably, voltage drops in those stages at the time of charge delivery from the preceding stages can be prevented, while an increase in the layout area can be suppressed to the utmost.

In the former stages of this charge pump, when a boosted voltage is received by a capacitor C2 of one stage from a preceding-stage capacitor C2, any loss of the voltage delivered from the preceding stage is suppressed by timely changing the clock signal CLK1 or CLK3 inputted to the corresponding capacitor C1 from the ground level to the power supply voltage level. After that, the voltage is boosted by changing the clock signal CLK2 or CLK4 inputted to the capacitor C2 from the ground level to the power supply voltage level. As a result, the voltage is boosted from the level obtained in the preceding stage by a magnitude approximately equal to a magnitude of the power supply voltage. In these former stages, the backgating effect has less of an influence so that almost no change can be seen in the threshold voltages of the transistors. Accordingly, for these former stages of the charge pump, boosting of the input clock signals by the clock signal boost circuit 10 is not implemented with the aim of reducing the layout area.

In the latter stages of the high voltage charge pump, however, as the boosted voltage increases, the threshold voltages of the transistors N1, N2 become higher due to the backgating effect. If the increasing threshold voltages of the transistors have become equal to the clock voltage (normally, power supply voltage Vcc) of the input clock signals CLK1–CLK4, a boosted voltage delivered from the preceding stage and a boosted voltage to be delivered to the succeeding stage become equal. That is, when a state of "transistor threshold voltage=clock signal voltage" results, voltage boosting can no longer be done even if the number of stages of the high voltage charge pump is increased. Accordingly, without using a technique of either lowering the threshold voltage of the transistor or raising the clock signal voltage, it would be impossible to accomplish further voltage boosting by the high voltage charge pump.

Figure 1A:
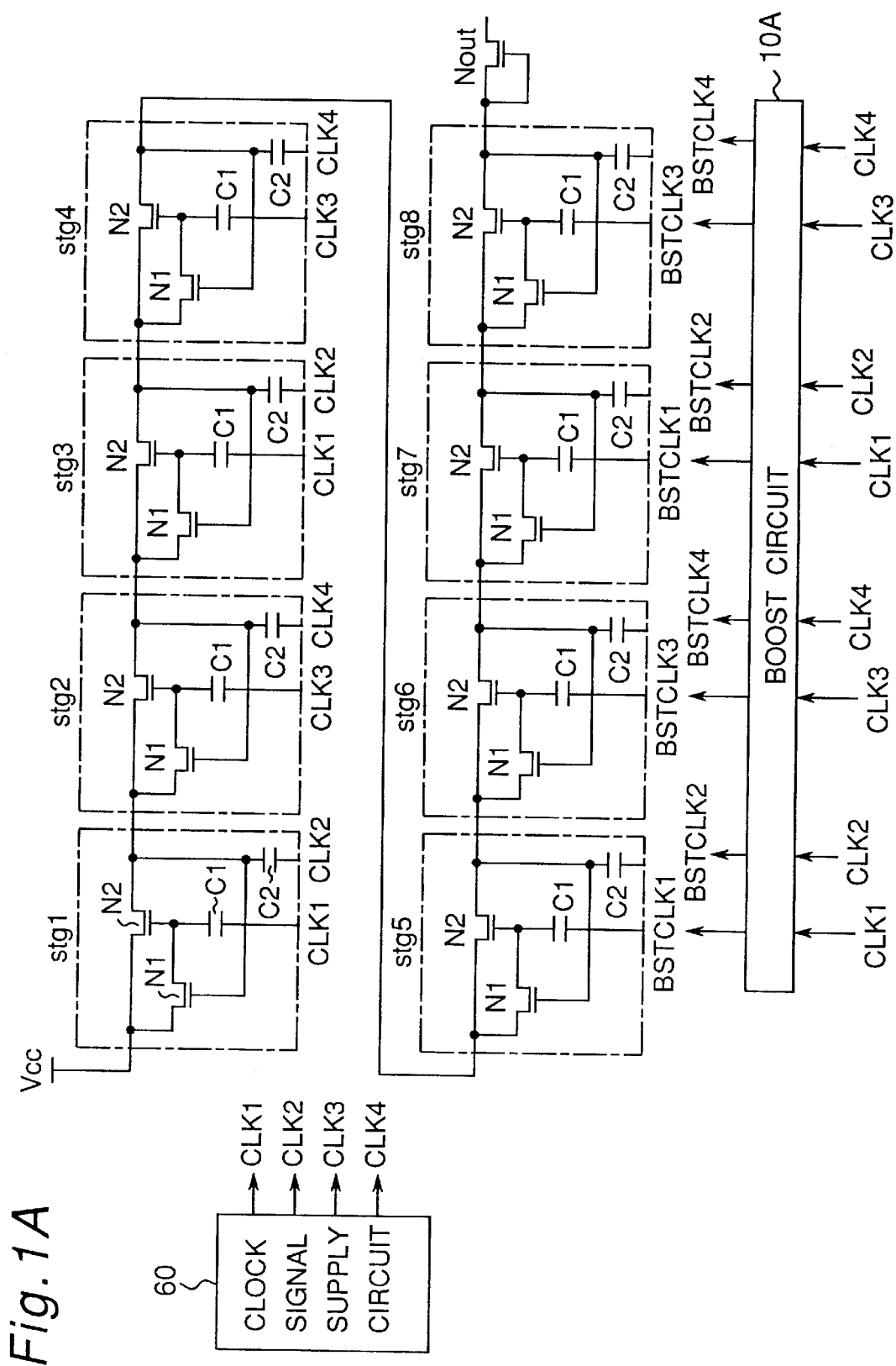
FIG. 1A is a circuit diagram of a modification of the FIG. 1 embodiment.
Figure 2:
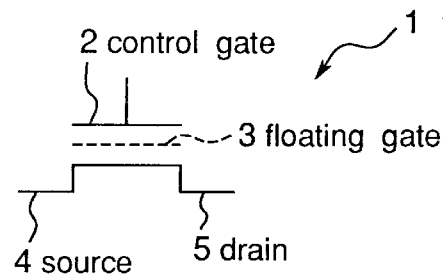
FIG. 2 schematically shows the cell structure of the flash memory.

The present invention adopts the technique of raising the clock signal voltage. In this case, the charge pump may be arranged such that all the clock signals CLK1–CLK4 to be applied to the capacitor C1 and the capacitor C2 of each boosting stage on the latter stage side are boosted, as shown in FIG. 1A, wherein reference symbol 1A indicates a clock signal boost circuit. It is not necessarily required, however, to boost both the signal voltages of the clock signals CLK1, CLK3 in one group and the signal voltages of the clock signals CLK2, CLK4 in the other group. By boosting either one group of input clock signals, a further boost of an output voltage of the high voltage charge pump can be accomplished. Desirably, determination on this issue is made by weighing design targets for layout area and charge pump output voltage against each other.

In this embodiment, only the voltages of the input clock signals CLK1, CLK3 for driving the transistors N2 are boosted for suppressing any loss at the time of charge delivery. By not boosting the voltages of the input clock signals CLK2, CLK4 for boosting the charge voltage delivered from the preceding stage, a reduction in the layout area is intended. Normally, capacitors driven by CLK2, CLK4 are larger in capacity than capacitors driven by CLK1, CLK3. Accordingly, if the boost circuit 10 for input clock signals is provided also for the clock signals CLK2, CLK4 as well, then capacitors in the boost circuit must be relatively large in capacity, resulting in an increase in the layout area. In view of this, in this embodiment, only the voltages of the input clock signals CLK1 and CLK3 for driving the transistors N2 are boosted to the clock signals BSTCLK1 and BSTCLK3, respectively. According to the present embodiment, by using the thus boosted clock signals BSTCLK1 and BSTCLK3 instead of the clock signals CLK1 and CLK2 in the latter stages of the high voltage charge pump, charge delivery loss is suppressed, and a high voltage that could not be generated with the input clock signals CLK1, CLK3 can be generated and output even with a low-voltage power supply.

The clock signal boost circuit 10 may be provided for each of the latter stages, as shown in FIG. 1. Alternatively, one boost circuit for the clock signal CLK1 and one boost circuit for the clock signal CLK3 may be provided such that an output (boosted clock signal BSTCLK1) of the former circuit is supplied commonly to the fifth and seventh stages, and an output (boosted clock signal BSTCLK3) of the latter circuit is supplied commonly to the sixth and eighth stages. In this case, an effect of further reduction in the layout area can be produced.

Next, the arrangement of the clock signal boost circuit 10 is described in detail.

As described above, an ordinary boost circuit can be used as the clock signal boost circuit 10. Alternatively, the clock signal boost circuit may be arranged such that its operational mode can be switched over between a boosting mode and a non-boosting mode and/or that the magnitude of a voltage by which the clock signal is boosted (also referred to as simply "boost magnitude") can be changed, for the following reason.

In a case that an integrated circuit, in which the charge pump is included, uses a wide range of power supply voltages or a low power supply voltage, boosting of clock signals is required for low power supply voltages. On the other hand, for relatively high power supply voltages, boosting is not required or only a small boost magnitude is enough. Therefore, by providing an arrangement that boosting/non-boosting and/or the boost magnitude can be switched over depending on the power supply voltage, it becomes possible to apply clock signals of an optimum voltage amplitude to the boosting stages. As a result, a risk of breakdown of capacitors or the like due to application of excessively boosted clock signals is obviated.

More specifically, when a wide range of power supply voltage is involved, for example when two power supply voltages of 1.8 V and 3.3 V are set, boosting of clock signals is effective for the power supply voltage of 1.8 V, while the voltage level of the boosted clock signal BSTCLK becomes too high at the power supply voltage of 3.3 V under similar circuit conditions, which may result in breakdown of capacitors and the like. Therefore, in the 3.3 V power supply voltage mode, the voltage level of the boosted clock signal BSTCLK need to be lowered. Further, if the power supply voltage is 5 V, a design boosted voltage can be accomplished with clock signals of an amplitude equal to a magnitude of the power supply voltage, and there is no need for boost operations of clock signals. As is obvious from the above, in order to prevent the breakdown of capacitors and the like, it is necessary to change the boost potential of the clock signals depending on the magnitude of the power supply voltage.

Figure 6:
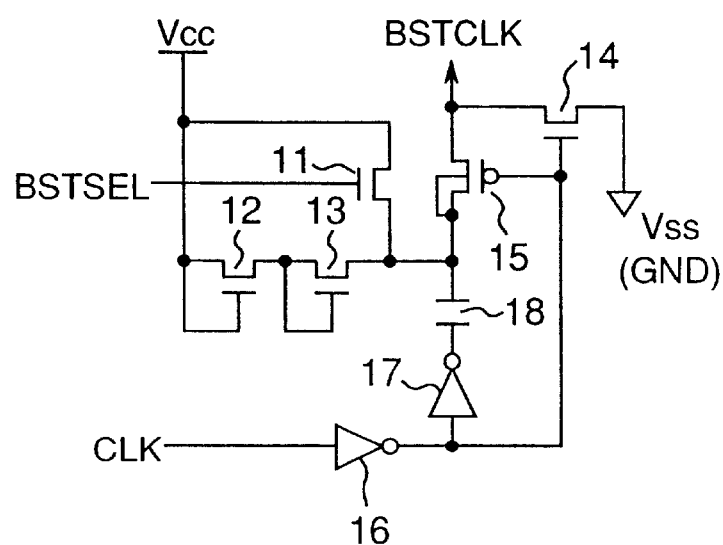
FIG. 6 is a circuit diagram showing an arrangement example of a clock signal boost circuit.

FIG. 6 is an equivalent circuit diagram showing an arrangement example of the clock signal boost circuit in which the boost magnitude, or increment can be changed. This circuit has transistors 11–15, inverters 16 and 17, and a capacitor 18, and is effective for use in applications where, for example, 1.8 V and 3.3 V are set as the power supply voltages. With the power supply voltage of 1.8 V, the boost magnitude is made large by a select signal BSTSEL being set to "H", while with the power supply voltage of 3.3 V, the boost magnitude is made small by the select signal BSTSEL being set to "L". The select signal BSTSEL of the specified level according to the power supply voltage may be input from outside, or otherwise, generated by an internal circuit (a voltage detection circuit).

Figure 7:
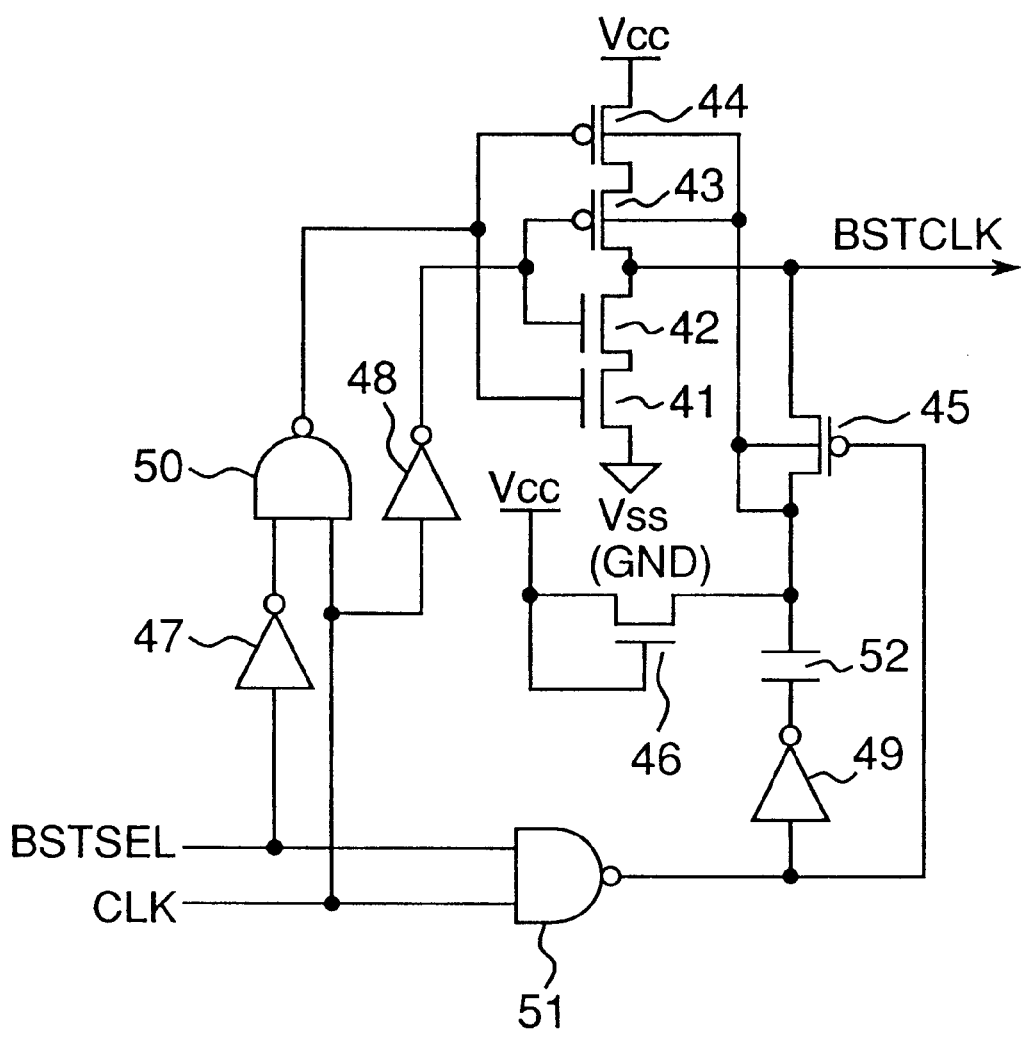
FIG. 7 is a circuit diagram showing another arrangement example of the clock signal boost circuit.

FIG. 7 is an equivalent circuit diagram showing an arrangement example of the clock signal boost circuit in which the circuit operation can be switched over between boosting and non-boosting. This circuit has transistors 41–46, inverters 47–49, NAND logic gates 50 and 51, and a capacitor 52, and is effective for use in applications where, for example, 1.8 V and 5 V are set as the power supply voltages. In the 1.8 V power supply voltage mode, the boost operation for clock signals is executed by the select signal BSTSEL being set to "H", while in the 5 V power supply voltage mode, the boost operation is halted by the select signal BSTSEL being set to "L". As in the above case shown in FIG. 6, the select signal BSTSEL of H or L level according to the power supply voltage may be input from outside, or otherwise, generated by an internal circuit (a voltage detection circuit).

By using the clock signal boost circuit shown in FIGS. 6 or 7, even with relatively high power supply voltages, risk of breakdown of capacitors, transistors and the like due to overboost of the clock signals is obviated.

The clock signal boost circuit may also be implemented as a circuit in which both the switchover between the boost mode and the non-boost mode and the change of boost magnitudes are enabled. Such an arrangement makes the clock signal boost circuit ready for use in applications where, for example, 1.8 V, 3.3 V and 5 V are set as the power supply voltages.

(Embodiment 2)

The above embodiment has been described regarding a case in which the present invention is embodied in a charge pump for generating positive voltages magnified in the positive direction. However, the present invention may also be embodied in a negative voltage charge pump for generating negative voltages magnified in the negative direction.

Figure 8:
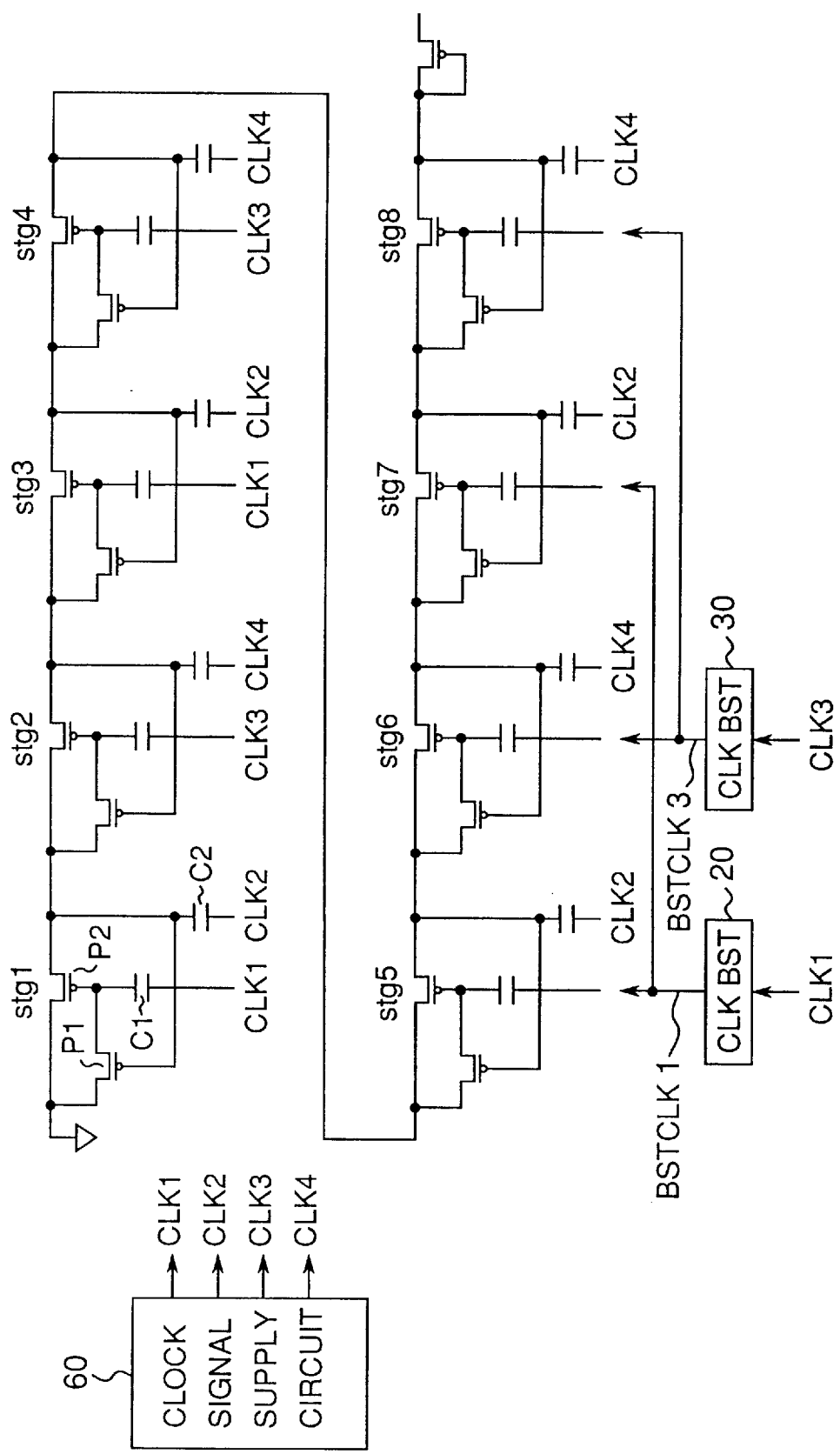
FIG. 8 is a circuit diagram showing a negative voltage charge pump which is a second embodiment of the present invention.
Figure 9:
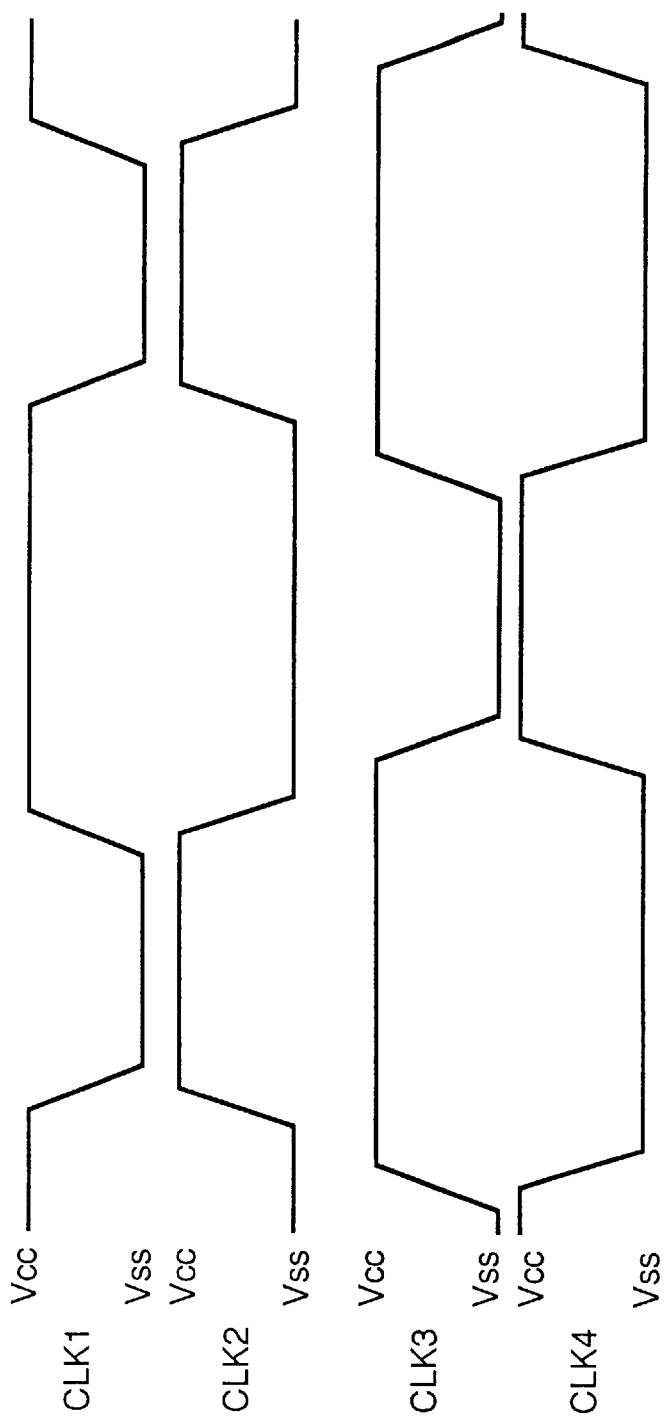
FIGS. 9A, 9B, 9C and 9D are waveform diagrams of clock signals for driving the negative voltage charge pump, respectively.

FIG. 8 is a circuit diagram showing the arrangement of a negative voltage charge pump which is a second embodiment of the present invention. In FIG. 8, parts similar to those in FIG. 1 are indicated by the same reference symbols. The structure of each of a plurality of boosting stages stg1, . . . , stg8 (8 stages in the figure) is basically similar to the structure of FIG. 1, but differs therefrom in that, to output negative voltages, the transistors are changed from N-channel MOS transistors (N1, N2) to P-channel MOS transistors (P1, P2). Like the high voltage charge pump shown in FIG. 1, a boosted clock signal BSTCLK1 or BSTCLK3 is applied only to the fifth and the following boosting stages on the latter side. Specifically, one boost circuit 20 for a clock signal CLK1 and one boost circuit 30 for a clock signal CLK3 are provided, and an output (boosted clock signal BSTCLK1) of the boost circuit 20 is supplied commonly to the fifth and the seventh boosting stages, and an output (boosted clock signal BSTCLK3) of the boost circuit 30 is supplied commonly to the sixth and the eighth boosting stages. These clock signal boost circuits 20, 30 may be implemented by the aforementioned boost circuit shown in FIGS. 6 or 7, or a boost circuit of other configuration. Waveforms of the clock signals CLK1–CLK4 for driving the negative voltage charge pump are shown in FIGS. 9A, 9B, 9C and 9D, respectively.

In each of the pump stages, shown in FIG. 8, to which the clock signals CLK1 and CLK2 are input, the P-channel MOS transistor P2 is turned ON by the clock signal CLK1 changing in level from Vcc (power supply voltage level) to Vss (ground level), thus suppressing any voltage drop in terms of absolute value (that is, suppressing a shift of the level of the delivered negative voltage toward the ground level) at the time of delivery of the negative electric charge from the preceding stage. Thereafter, the clock signal CLK1 changes from Vss to Vcc, and the clock signal CLK2 changes from Vcc to Vss, by which the negative voltage is stepped down by a voltage approximately equal to the magnitude of the power supply voltage. Similarly, as to the boosting stages to which the clock signals CLK3 and CLK4 are input, the P-channel MOS transistor P2 is turned ON by the clock signal CLK3 changing from Vcc (the power supply voltage level) to Vss (the ground level), thus suppressing any voltage drop in terms of absolute value at the time of delivery of the negative electric charge from the preceding stage. Then, the clock signal CLK3 changes from Vss to Vcc, and the clock signal CLK4 changes from Vcc to Vss, by which the negative voltage is stepped down by a voltage approximately equal to the magnitude of the power supply voltage.

However, also in the negative voltage charge pump, there may occur a problem that the threshold voltages (absolute value) of P-channel MOS transistors increase too much. In worst cases, further step-down of a negative voltage could no longer be attained.

Figure 10:
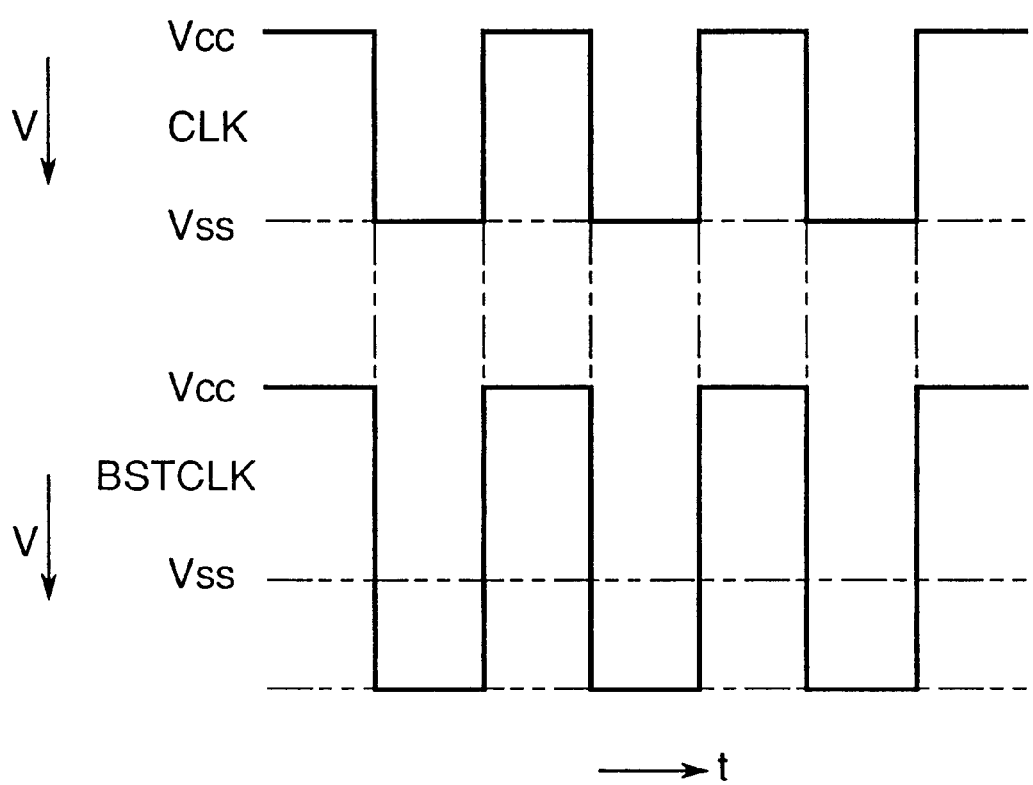
FIG. 10 is an explanatory signal waveform diagram schematically showing the relationship between clock signal CLK and boosted clock signal BSTCLK in the second embodiment.

In order to solve this problem, in the present embodiment, a clock signal BSTCLK (BSTCLK1 or BSTCLK3, for which same reference symbols as those in embodiment 1 are used for the sake of convenience) is applied to the capacitor C1 connected with a gate of the P-channel MOS transistor P2 provided for charge delivery in the fifth and the subsequent pump stages. The clock signal BSTCLK (BSTCLK1 or BSTCLK3) has been boosted in the negative direction, as schematically shown in FIG. 10, such that their voltage swing is larger than that of the clock signals CLK1 and CLK3 and that the signal L level changes between the ground potential and a negative potential. The problem of increase in the threshold voltage (absolute value) of the P-channel MOS transistors of the charge pump is solved by inputting to the charge pump the clock signals BSTCLK1, BSTCLK3 having an increased voltage swing, instead of the clock signals CLK1, CLK3. That is, by the capacitor C1 connected between the gate of the P-channel MOS transistor and BSTCLK, a voltage stepped down further than when the clock signals CLK1 and CLK3 are used is applied to the gate of the P-channel MOS transistor, thus making it possible to reliably turn ON the P-channel MOS transistor P2 having an increased threshold voltage. As a result, loss at the time of charge delivery due to an increase in the threshold voltage (absolute value) of the P-channel MOS transistor is suppressed, and generation of negative voltages can be accomplished with high efficiency.

In the former pump stages, because almost no changes are seen in the threshold voltage of the P-channel MOS transistors, boosting of the clock signals with a boost circuit is not implemented from a viewpoint of reducing the layout area.

It should be understood that in the negative voltage charge pump of the second embodiment also, the clock signal boost circuits 20 and 30 can be designed such that the boost magnitude, or increment of the voltage swing, of the clock signal can be changed according to the power supply voltage and/or that the circuit operation can be switched over between a boosting mode and a non-boosting mode according to the power supply voltage, as described in connection with the boost circuit 10 of the first embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charge pump, comprising:

n (n: an integer, n≧2) series-connected boosting stages for receiving an input voltage and providing a boosted output voltage, each boosting stage having first and second switching transistors and first and second boosting capacitors associated with the first and second switching transistors, respectively, each boosting capacitor connected with a gate of the associated switching transistor;

a clock signal supply circuit for providing a first clock signal and a second clock signal which have specified phases different from each other; and a clock signal boost circuit for boosting voltages of the first and second clock signals, wherein in m (m: an integer, n>m≧1) latter boosting stages, inclusive of a final boosting stage, of all the n boosting stages, the first and second boosting capacitors are supplied with the boosted first and second clock signals output from the clock signal boost circuit, respectively, while in (n−m) former boosting stages, the first and second boosting capacitors are directly supplied with the first and second clock signals output from the clock signal supply circuit, respectively.

2. The charge pump according to claim 1, wherein said clock signal boost circuit comprises a circuit for switching an operational mode of the clock signal boost circuit between a boosting mode and a non-boosting mode, in accordance with a control signal.

3. The charge pump according to claim 1, wherein said boost circuit comprises a circuit for changing a magnitude of a voltage by which the clock signals are boosted, in accordance with a control signal.

4. The charge pump according to claim 1, which is a negative voltage charge pump and provides a voltage boosted in a negative direction.

5. The charge pump according to claim 2, which is a negative voltage charge pump and provides a voltage boosted in a negative direction.

6. The charge pump according to claim 3, which is a negative voltage charge pump and provides a voltage boosted in a negative direction.

7. A charge pump, comprising:

n (an integer, n≧2) series-connected boosting stages for receiving an input voltage and providing a boosted output voltage of a magnitude, each boosting stage having first and second switching transistors and first and second boosting capacitors associated with the first and second switching transistors, respectively, each boosting capacitor connected with a gate of the associated switching transistor;

a clock signal supply circuit for providing a first clock signal and a second clock signal which have specified phases different from each other; and a clock signal boost circuit for boosting a voltage of one of the first and second clock signals, wherein in m (m: an integer, n>m≧1) latter boosting stages, inclusive of a final boosting stage, of all the n boosting stages, if the first clock signal is boosted, the first and second boosting capacitors are supplied with the boosted first clock signal output from the clock signal boost circuit and the second clock signal output from the clock signal supply circuit, respectively, and if the second clock signal is boosted, the first and second boosting capacitors are supplied with the first clock signal output from the clock signal supply circuit and the boosted second clock signal output from the clock signal boost circuit, respectively, while in (n−m) former boosting stages, in both cases, the first and second boosting capacitors are directly supplied with the first and second clock signals output from the clock signal supply circuit, respectively.

8. The charge pump according to claim 7, wherein said clock signal boost circuit comprises a circuit for switching an operational mode of the clock signal boost circuit between a boosting mode and a non-boosting mode, in accordance with a control signal.

9. The charge pump according to claim 7, wherein said boost circuit comprises a circuit for changing a magnitude of a voltage by which the clock signals are boosted, in accordance with a control signal.

10. The charge pump according to claim 7, which is a negative voltage charge pump and provides a voltage boosted in a negative direction.

11. The charge pump according to claim 8, which is a negative voltage charge pump and provides a voltage boosted in a negative direction.

12. The charge pump according to claim 9, which is a negative voltage charge pump and provides a voltage boosted in a negative direction.

13. A charge pump, comprising:

a plurality of series-connected boosting stages for receiving an input voltage and providing a boosted output voltage;

a clock signal supply circuit for providing a first clock signal and a second clock signal that have same waveforms, but different phases from each other, wherein the first clock signal is intended for odd-numbered boosting stages and the second clock signal is intended for even-numbered boosting stages; and a clock signal boost circuit for boosting voltages of the first and second clock signals, wherein each of one or more latter boosting stages, inclusive of a final boosting stage, of all the boosting stages, is supplied with the boosted first or second clock signal, while each of the other, former boosting stages is supplied with the first or second clock signal not boosted.

14. The charge pump according to claim 13, wherein said clock signal supply circuit further provides third and fourth clock signals that have same waveforms, but different phases from each other, the third and fourth clock signals being intended for the odd-numbered boosting stages and the even-numbered boosting stages, respectively;

said clock signal boost circuit further boosts the third and fourth clock signals; and each of said one or more latter boosting stages is further supplied with the boosted third or fourth clock signal, while each of the former boosting stages is further supplied with the third or fourth clock signal not boosted.

15. The charge pump according to claim 13, wherein said clock signal supply circuit further provides third and fourth clock signals that have same waveforms, but different phases from each other, the third and fourth clock signals being intended for the odd-numbered boosting stages and the even-numbered boosting stages, respectively; and each of all the boosting stages is further supplied with the third or fourth clock signal not boosted.

16. The charge pump according to claim 14, wherein each boosting circuit has two switching transistors and two boosting capacitors which are connected with gates of the transistors, respectively; and in each of the odd-numbered boosting stages, either the first and third clock signals not boosted or the boosted first and third clock signals are applied to the two boosting capacitors, respectively, while in each of the even-numbered boosting stages, either the second and fourth clock signals not boosted or the boosted second and fourth clock signals are applied to the two boosting capacitors, respectively.

17. The charge pump according to claim 15, wherein each boosting circuit has two switching transistors and two boosting capacitors which are connected with gates of the switching transistors, respectively; and in each of the odd-numbered boosting stages, either the first and third clock signals not boosted or the boosted first clock signal and the third clock signal not boosted are applied to the two boosting capacitors, respectively, while in each of the even-numbered boosting stages, either the second and fourth clock signals not boosted or the boosted second signal and the fourth clock signal not boosted are applied to the two boosting capacitors, respectively.

18. The charge pump according to claim 13, wherein said clock signal boost circuit comprises a circuit for switching an operational mode of the clock signal boost circuit between a boosting mode and a non-boosting mode, in accordance with a control signal.

19. The charge pump according to claim 13, wherein said boost circuit comprises a circuit for changing a magnitude of a voltage by which the clock signals are boosted, in accordance with a control signal.

20. The charge pump according to claim 13, which is a negative voltage charge pump and provides a voltage boosted in a negative direction.

* * * * *